Jan. 8, 1935.                    C. K. POWELL                    1,987,336
                              EGG PICK-UP APPARATUS
                              Filed April 10, 1930              3 Sheets-Sheet 1
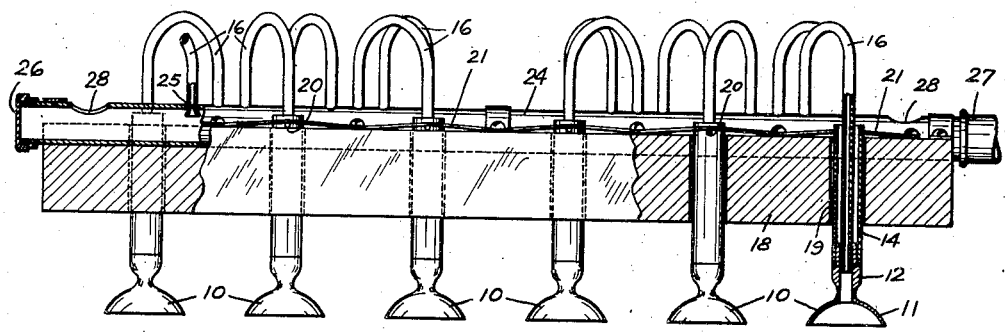
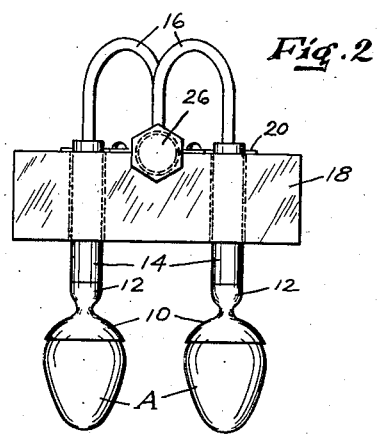  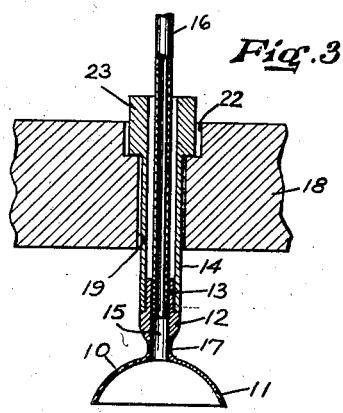
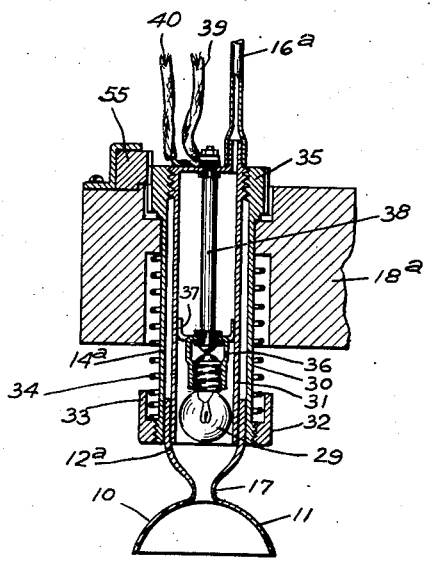
INVENTOR.
Charles K. Powell.
BY Duell, Dunn & Anderson.
ATTORNEYS.

Jan. 8, 1935.  C. K. POWELL  1,987,336
EGG PICK-UP APPARATUS
Filed April 10, 1930  3 Sheets-Sheet 2
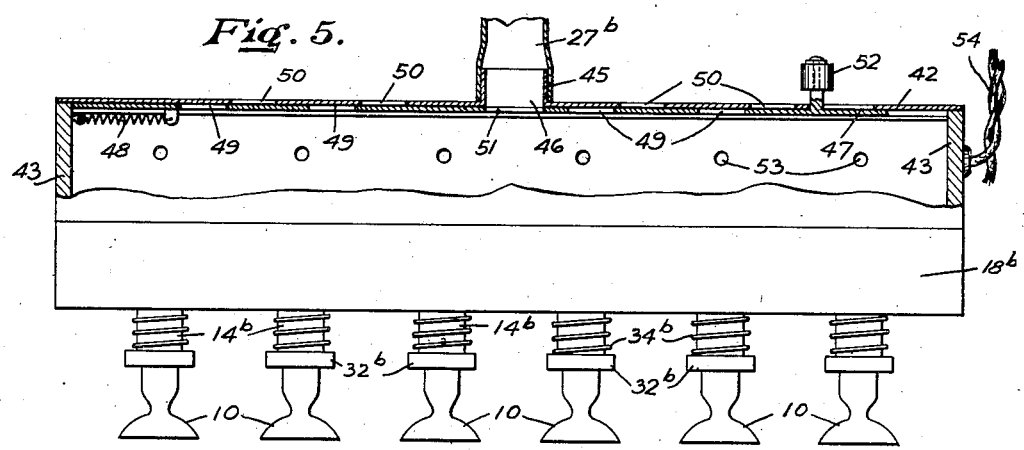
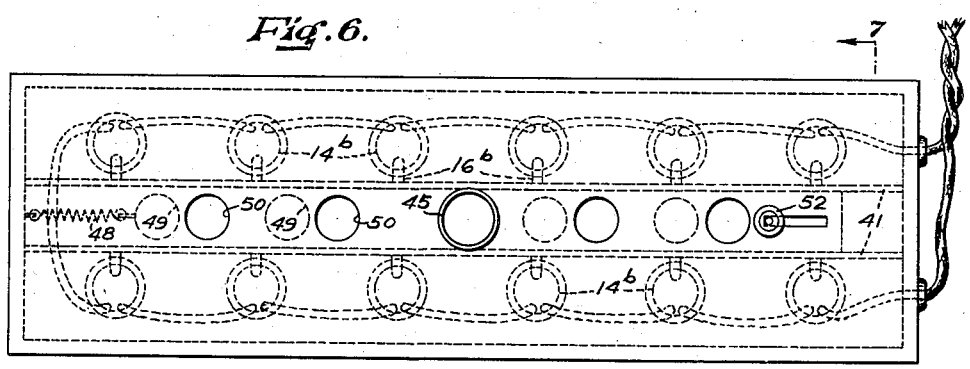
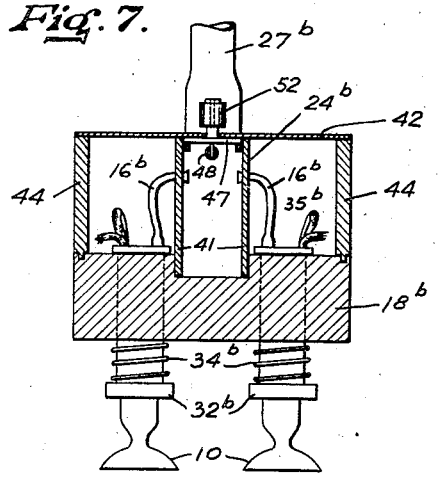
INVENTOR.
Charles K. Powell.
BY
Buell, Dunn & Anderson
ATTORNEYS.

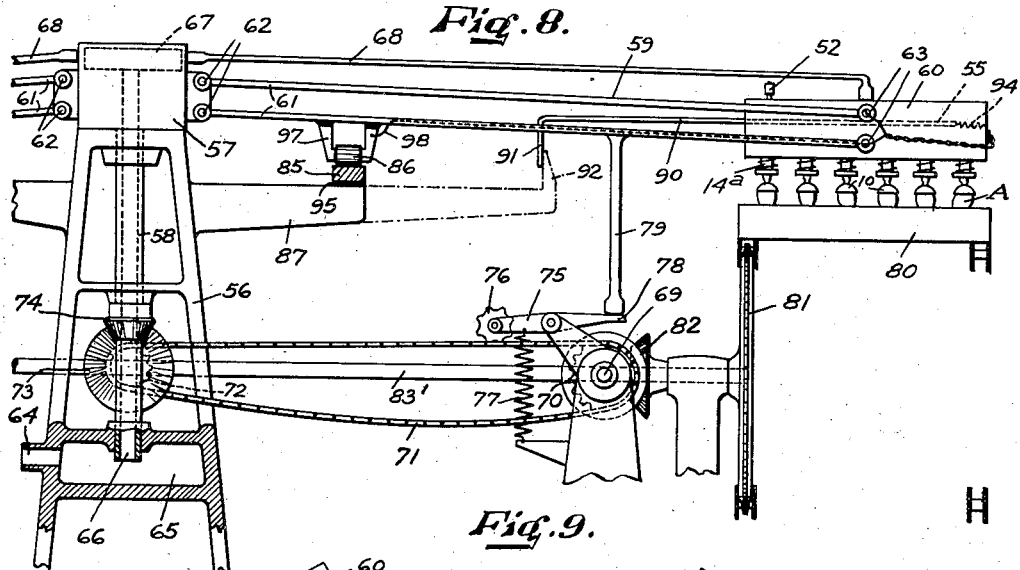
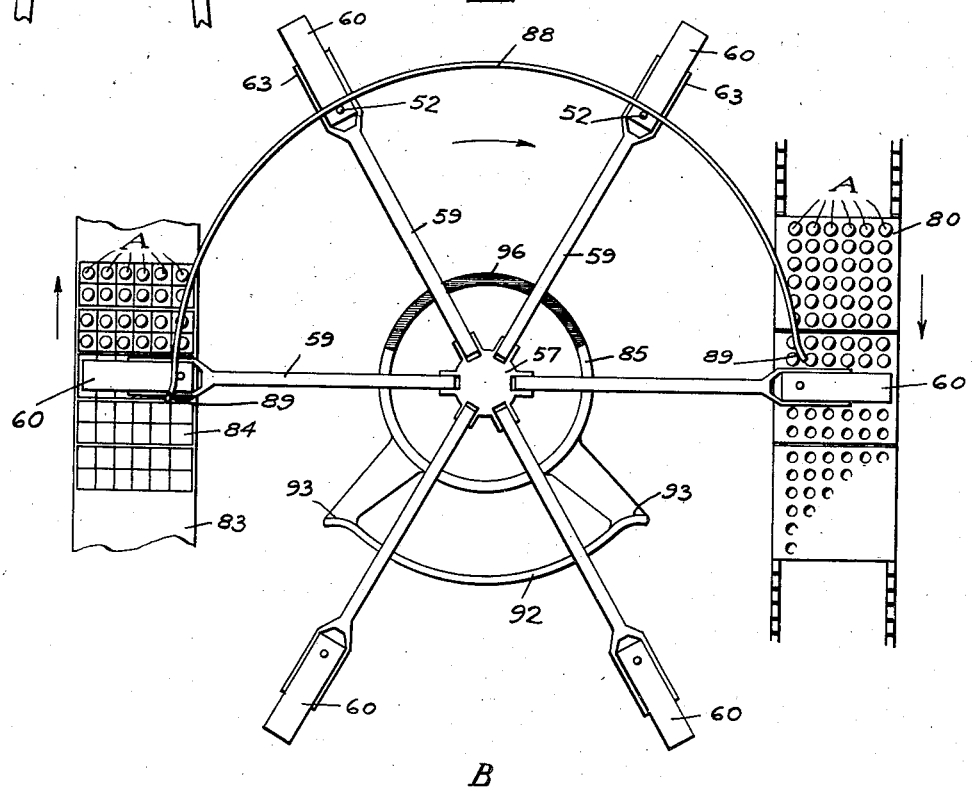

Patented Jan. 8, 1935

1,987,336

UNITED STATES PATENT OFFICE 1,987,336

EGG PICK-UP APPARATUS

Charles K. Powell, New York, N. Y., assignor to Pacific Egg Producers Cooperative, Inc., New York, N. Y., a corporation of New York Application April 10, 1930, Serial No. 443,084

13 Claims. (Cl. 99—6)

This invention relates to improvements in article pick-up and transfer apparatus, and with reference to some of the more particular features thereof it relates to improvements in apparatus for holding or transferring eggs or similar articles and/or for testing the eggs to locate defects or imperfections.

It is a general object of the invention to provide an improved construction and arrangement for apparatus of the class mentioned, simple and inexpensive in arrangement and practical and efficient in operation, whereby articles may be picked up and held firmly for transfer thereof, for observation, or for the performance of any other operation thereon.

A further object of the invention is to provide an improved article pick-up device which is self-adjusting into correct article engaging position and is constructed and arranged to minimize danger of damage to fragile articles, such as eggs or the like.

A further object is to provide an improved mounting for a lifting chuck so as to impart to the chuck a high degree of adaptability to accommodate it to various shape, position, size, and so forth, of the articles with which it cooperates.

Still another object is to provide a pick-up chuck or article lifting device, either of the vacuum or other type, with an improved self-adjusting flexible mounting whereby the chuck may tilt or rock or retract or otherwise adapt itself to the best or most efficient position for engagement with the articles.

Another object is to provide a unitary group of article engaging pick-up devices having improved flexible individual adjustment whereby the several pick-up devices may at the same time be adjusted into many different positions accommodating them for individual and simultaneous supporting cooperation with a plurality of separate objects which may be of various shape, size, or position.

A further object is to provide a unitary group of article engaging pick-up devices individually and simultaneously engageable with a plurality of articles and having improved means either manually or automaticaly controlled for establishing and discontinuing the lifting engagement with the articles.

A further object is to provide an improved vacuum chuck adapted for lifting engagement with eggs or other articles having an improved flexible or pliable mounting adapting the chuck for universal adjustment to accommodate it for lifting engagement with articles of various shape, size or position.

Another important object of the invention is to provide an article lifting chuck with an improved arrangement for directing light rays on to the carried articles for testing or other purposes, such as candling eggs.

A further object is to provide an article pick-up and transfer apparatus having improved transfer means for taking articles from a moving conveyor and transferring them to another moving conveyor, or from one location to another.

Another object is to provide in an article pick-up and transfer apparatus improved transfer means capable of halting or movable at a variant or differential speed whereby the pick-up elements may halt or move at the same speed as that of a conveyor when coming into engagement with articles carried by the latter, and at other times may move at a greater speed.

A further important object of the invention is to provide an improved automatic egg testing means for moving the eggs into different positions and for rotating them while directing the testing or candling light through them.

Another object of the invention is to provide an improved egg candling apparatus whereby a plurality or a group of eggs may be simultaneously controlled, either by vacuum supporting chucks or by other forms of supports, so as to move them into different positions while directing the candling light thereupon.

Other objects of the invention will be in part pointed out in the following detailed description of certain illustrative but preferred embodiments of the invention, and will be in part obvious as the disclosure proceeds.

The invention accordingly comprises the features of construction combinations of elements, and arrangement of parts, which will be exemplified in the construction hereinafter set forth and the scope of the application of which will be indicated in the claims.

For a more complete understanding of the nature and objects of the invention reference is had to the following detailed description, and to the accompanying drawings, in which:

Fig. 1 is a side elevation, partially in central vertical longitudinal section, of an article pick-up apparatus embodying the invention;

Fig. 2 is an end elevation thereof;

Fig. 3 is an enlarged central section of one of the improved pick-up chucks with mounting therefor and disclosing a slightly modified structure from that of Fig. 1;

Fig. 4 is a fragmentary enlarged transverse section depicting in central section a modification of the improved pick-up chuck equipped with a testing or egg candling means;

Fig. 5 is a side elevation similar to Fig. 1 disclosing a modified arrangement for mounting and controlling the group of individual article supports;

Fig. 6 is a plan of Fig. 5;

Fig. 7 is a transverse section taken substantially on the line 7—7 of Fig. 6;

Fig. 8 is a fragmentary elevation with parts in section of an improved automatic transfer and testing apparatus embodying the invention, and Fig. 9 is a partially diagrammatic plan view of the apparatus of Fig. 4.

Since the article pick-up element or supporting chuck forms per se one of the most important features of this invention, it will be first described in the general detailed disclosure of the invention. A preferred form of this chuck is shown in Figs. 1, 2 and 3 and is indicated generally by the reference 10.

This improved chuck 10 is preferably constructed of a material having a high degree of flexibility and pliability so as to accommodate itself to the article to be engaged and lifted. Soft, pliable rubber is satisfactory for this purpose and is preferred particularly where a vacuum lift is employed. The article engaging part is preferably made in the form of a cup 11 of rubber shaped to conform to the articles A to be lifted, which in the present embodiment are shown as being eggs; it will be understood, however, that the apparatus may be utilized for lifting various other articles, such, for example, as fruit. The walls of this cup are thin enough to be quite pliable so as to conform readily to the surface of the article with which it is brought into contact and to lie in intimate engagement therewith, so as to form a substantially air-tight arrangement.

A supporting stem or neck 12 supports the cup 11, being preferably made of the same material and integral therewith. This supporting stem has a connecting nipple or extension 13 engageable with a supporting spindle 14 shown as being in the form of a hollow tube. A passageway or conduit 15 leads through this supporting neck communicating with the cup 11, and a flexible vacuum supply tube 16 is connected to the neck 12 leading to a suitable source of vacuum supply (not shown).

For the purpose of imparting a high degree of adaptability to position, the supporting piece or neck 12 has a part 17 thereof of increased pliability. This pliable connecting portion is preferably positioned adjacent or near to the base of the cup and is arranged to increase the freedom of cup movement in all angular directions. A convenient way of attaining this high degree of pliability and freedom of cup movement is to contract the neck walls at 17, either by making them thinner as shown, or by contracting the neck diameter or by both of these methods. It will be noted that the flexible supporting section 17 is free from engagement with any of the supporting parts or other relatively rigid elements thus assuring its freedom of flexibility in all directions.

This arrangement accomplishes a very important and advantageous result, as it provides for a free universal adjustment of the cup for adapting it for engagement with articles of variant shape, size, position, etc. Thus, when the cup is brought into contact with an egg it will cooperate with the surface of the latter which automatically imparts an adjusting movement to the cup unil the latter occupies a relative position in which the cup walls lie in close engagement with the egg surface, and the chuck is correctly centered with reference to the egg. Due to the flexible connection 17 there is very little, or no appreciable resistance to such adjusting movement and the cup will readily accommodate itself into intimate contacting position irrespective of irregularities and variations in egg shape, size, or position relatively to the cup. This is of prime importance particularly where a vacuum lift is employed as it assures the correct engagement between the egg and cup to form a substantially air-tight joint, avoiding failure to lift the article and preventing dropping the same after being lifted.

In order further to increase the adaptability of the lifting chuck 10 to variant position, the supporting spindle 14 is preferably mounted for yielding retraction in a support, such as the supporting head 18 which may be of any preferred form. The supporting head shown is arranged for carrying a plurality of the lifting chucks but it will be understood that a single chuck may be carried by an appropriate form of supporting head if so desired.

For mounting the supporting spindle the supporting head 18 may be formed with an aperture 19 for receiving the spindle. As shown, the spindle extends entirely through the support 18 and at its upper end is provided with a stop lug 20 adapted to engage with the upper face of the support, thus limiting movement of the chuck in one direction but providing for retraction in the opposite direction. A light spring buffer 21 may be provided to yieldingly resist the retraction of the supporting chuck with its supporting spindle 14. This spring buffer may be any preferred form of spring, being shown as a light leaf spring or rubber band attached to the top of the supporting head 18 and engaging the upper side of the stop lug 20.

It will thus be seen that the pick-up chuck 10 is supported for yieldingly resisted retraction and that its downward movement is limited by the stop lug 20. This arrangement provides still further for the adjustment of the lifting chuck whereby the latter may be automatically positioned for correct supporting engagement with the lifted article.

Referring to Fig. 3, the construction of the chuck 10 and of the support 18 may be the same as that of Figs. 1 and 2, and the construction of the supporting spindle 14 may also be substantially the same. However, the stop arrangement for limiting the chuck in extended position is slightly modified. In this case the opening 19 through the support 18 for receiving the spindle has at its upper portion an enlargement 22 forming a recess or seat for receiving the enlarged end 23 of the spindle. This enlarged end forms a stop lug cooperating with seat 22 for positioning the chuck. A spring buffer may also be utilized permitting a yieldingly resisted movement of the chuck as is done by the spring buffer 21 above described.

Although a single pick-up chuck has been described above as being mounted on the supporting head 18, a plurality of the chucks may be mounted and supported in this manner as illustrated. In fact, it is preferred for many purposes to mount the lifting chucks in groups as shown.

each chuck being individually mounted, constructed, and arranged for the accomplishment of the foregoing functions. Any desired number of the chucks may be thus mounted together in a unitary group.

For supplying vacuum to all of the chucks thus mounted, a vacuum manifold 24 is provided preferably mounted upon the supporting head 18. The vacuum manifold is shown as being in the form of an elongated tubular member extending along the upper face of the support 18 and attached thereto, and being provided with a plurality of apertures 25 spaced therealong for the reception of the ends of the vacuum tubes 16 which are preferably made of flexible, soft rubber. These connecting vacuum tubes may be attached in any preferred manner in the openings 25 to provide airtight joints, and are connected at their opposite ends to the vacuum chucks as described. The vacuum manifold is closed at one end by a header 26 and at its opposite end a supply tube 27 is connected, leading to a suitable vacuum supply (not shown). The supply tube 27 may be of flexible material such as soft rubber and if desired it can be made of considerable length so as to permit the unitary group of vacuum lifters to have a considerable range of movement thus providing means whereby articles carried thereby can be lifted and transported from point to point as, for example, from one carton or conveyor to another.

Since the source of vacuum supply is ordinarily constant, that is, it is maintained approximately at a constant pressure, means is provided for establishing the necessary lifting effort in the several vacuum chucks and also for discontinuing this lifting effort. This control may be exercised in different ways, and as shown in Fig. 1, it may be accomplished by providing the vacuum manifold with control openings or ports 28 which may be opened or closed at will by the operator. In this form the control ports may be closed by means of the operator's fingers. When the ports are opened each of the individual chucks is cut off from the vacuum supply, and the vacuum at each cup 11 is so reduced as to provide substantially no lifting effort. Any article carried thereby, therefore, under these conditions will be released.

When it is desired to establish lifting effort the operator closes the control ports 28 thus establishing a vacuum at each cup 11 which is of sufficient pressure to lift the articles engaged by the cups. The vacuum supply will be of sufficient strength or capacity to hold the articles with ample factor of safety, even though one or a plurality of the vacuum cups is opened and unprovided with an article to be lifted. The vacuum capacity may be sufficient to provide ample lifting effort at each cup even when all of the cups are opened and none is supplied with articles.

Fig. 4 discloses a further modified, preferred embodiment of the invention, the construction of the vacuum cup 11 with universal flexible support therefor being substantially the same as that above described and having the same important advantages. In this form, however, the supporting spindle 14a is of modified construction and houses a testing lamp 29 mounted adjacent to the vacuum cup 11 whereby light rays are directed through the latter for testing articles such, for example, as candling eggs carried by the vacuum chuck.

In this form the supporting spindle includes an outer supporting sleeve 30 and an inner sleeve 31 which may be threaded to the outer sleeve. The supporting neck or stem 12a for the vacuum chuck 10 is received between these inner and outer sleeves and supported thereby. An annular terminal block 32 is threaded to the lower end of the outer sleeve 30, having an upwardly extending flange providing a pocket for the reception of the lower end of a coiled compression spring 34, the upper end of which is received within a pocket formed in the underside of the supporting head 18 and engaged with the bottom of said pocket. The spring 34 is thus compressed between two abutments and functions to project the vacuum chuck forwardly into its normal, operative position, similarly to the spring buffers 21 above described. The upper end of the outer sleeve 30 is provided with a block or enlargement 35, the lower end of which engages in a pocket in the upper surface of the supporting head 18 so as to form a limiting stop for the supporting spindle, functioning in a manner similar to the stop 23 above described.

The electric lamp 29 is preferably of low candle power and voltage appropriate for egg candling purposes, being mounted in a socket 36 which is supported in any appropriate manner within the inner sleeve 31, as by means of the supporting lugs 37. Electric energy is conducted to the lamp 29 through an insulated conductor 38 mounted within the spindle, and a conductor 39, and ground wire 40. The lamp is thus positioned within the spindle so that light rays therefrom are confined to pass through the opening at the base of the cup 11 and thence to any article that may be carried by said cup.

It will be understood that each of the vacuum chucks when mounted in groups, as above described, may be provided with a candling light 29 and thus the eggs may be tested or candled in groups when supported by the vacuum chucks.

The inner sleeve 31 of each supporting spindle 14a is provided at its upper end with an apertured nipple to which the vacuum supply tube 16a is connected. The inner sleeve is air tight so as to form a vacuum chamber or conduit communicating with the vacuum cup. The form of vacuum chuck shown in Fig. 4 thus embodies all of the advantages described for the preceding embodiments and the additional advantage of a very convenient means for testing the eggs or other articles as they are lifted by the apparatus, or while they are being transferred from one position to another.

A further modified form of the improved lifting unit embodying a group of vacuum chucks 10 is illustrated in Figs. 5, 6 and 7. In this form the vacuum chucks together with the supporting spindles 14b may be substantially the same as above disclosed in connection with Fig. 4. The vacuum chucks are mounted in the supporting head 18b in a manner similar to that above described, the compression springs 34b functioning to maintain the chucks in normal operative position as illustrated and described in connection with Fig. 4.

In this form a modified vacuum manifold 24b is utilized including side plates 41, seated at their lower edges in the upper face of the supporting head 18b, and closed at their upper edges by means of a cover plate 42. End walls 43 complete the closure of the vacuum manifold so as to form an air-tight compartment. Side walls 44 may also lie between the supporting head 18b and the opposite lateral edges of the cover plate 42 whereby the device presents a finished external appearance, and compartments are provided for housing the flexible vacuum leads 16b, the electric light wires, and other operating elements.

In this form of the invention, a vacuum supply pipe 27b leading from a source of vacuum supply, communicates with the vacuum conduit 24b, being connected by a union 45 communicating with a port 46 in the cover plate 42. A valve or closure member 47 is longitudinally slidably mounted in close contact in the underface of the cover plate overlying the vacuum manifold, being urged into one extreme position by means of a tensioned spring 48. This valve closure member is provided with a series of exhaust ports 49 spaced so as to align in one position of the closure member with corresponding exhaust ports 50 formed in the cover plate. The valve closure member is also provided with a power or vacuum supply port 51 positioned to align with the supply port 46 in one position of the valve closure member. It will be observed that these ports are so arranged relatively to each other that the exhaust ports are closed when the supply port is open, and vice versa. The valve closure member 47 makes a substantially air-tight joint with the cover plate whereby the exhaust ports are closed when the closure member is moved by the spring to the left as observed in Fig. 5; while the supply port is tightly closed when the closure plate is moved to the right, the exhaust ports then being open by virtue of the registry of the ports 49 with the corresponding ports 50. It is obvious that the closure member 47 may be controlled manually to open and close the respective ports and for this purpose an operating member or lug 52 extends upwardly from the closure member into accessible position. This operating lug may also be adapted to cooperate automatically with an operating member as more fully later described, and for this purpose the lug may include a contact roller, as shown.

Openings 53 are formed in a series along each side of the vacuum manifold 24b, the ends of the flexible rubber vacuum tubes 16b being connected in these openings as shown in Fig. 7 so as to make air-tight joints. It will be understood that these vacuum tubes are connected at their other ends to the individual chucks as shown in Fig. 4.

Each of the vacuum chucks is preferably also provided with a testing lamp mounted as shown in Fig. 4. Electric conductors 54 lead to these lamps which may be connected in series as shown in Fig. 6 so that the conductor 54 may be attached to an ordinary standard electric light circuit, the lamps 29 being of low voltage, say about 10 volts each. It will be understood, however, that the lamps may be connected either in series or in parallel to suit local conditions and they are preferably connected in parallel in the automatic apparatus of Figs. 8 and 9 as the low voltage is preferable for the contact arrangement.

Whereas the stop lugs 35b for limiting downward movement of the vacuum chucks are shown as being substantially similar to the limiting lugs 23 of Fig. 3, it will be understood that they may be of a different type. For example, they may be of the type shown in Fig. 4, wherein the lugs are in the form of toothed pinions 35 engaging with the teeth of the longitudinally reciprocable rack bar 55 mounted upon the supporting head 18a. This rack bar may be reciprocated longitudinally either manually, or by automatic means as described later in connection with Figs. 8 and 9. When a rack bar is thus reciprocated, rotation of each of the vacuum chucks is thereby effected, imparting to the latter a rotary oscillatory movement. This feature is important in the testing or candling of eggs rotating the latter so as to present different sides thereof to the observer. Also, when the rotation is effected quickly the shell of the egg may be displaced or rotated with reference to the egg contents. It will be understood that the rack bar 55 will engage a pinion on each one of the vacuum chucks so that movement of the rack bar simultaneously rotates a plurality of the chucks connected therewith. When two longitudinal series of chucks are provided, as in Figs. 5, 6 and 7, there may be one of these rack bars for each longitudinal series of chucks.

Figs. 8 and 9 illustrate partially diagrammatically one manner of mounting article pick-up devices for automatic machine operation. In the form shown, this apparatus is adapted to pick up the articles and to test, transfer and deposit them. While for some purposes the improved vacuum chuck hereinbefore set forth is not essential in this automatic apparatus, yet, for certain purposes, it is very advantageous as, among other reasons, it enables a plurality or group of articles to be simultaneously acted upon with very little likelihood of failure and with little danger of damaging fragile articles such as eggs.

A supporting framework 56 furnishes a support for the operative elements of the machine carrying a rotary turret 57 driven by a vertical shaft 58, mounted in appropriate bearings in the framework. This turret carries a plurality of radially disposed supporting arms 59 attached at their inner ends to the turret and each carrying at its outer end one of the article supporting units 60. As mentioned, these article supporting units may be of the vacuum type and they are shown in the drawings as being fitted with the vacuum chucks 14a, as above described.

Each supporting arm 59 as shown has upper and lower supporting bars 61 pivoted to the turret as indicated at 62 and pivoted at their outer ends to the supporting unit as indicated at 63. This arrangement provides for upward and downward swinging movement of the supporting unit during which said unit is caused to move parallel to itself. Both upper and lower supporting bars 61 are bifurcated at their outer ends 63 so as to lie at opposite sides of the supporting units, providing stable supports for the latter.

The vacuum supply, as shown, is connected at 64 communicating with a chamber 65 and through the conduit or passageway 66 in the shaft 58 to an upper chamber 67. From the vacuum chamber 67, a plurality of vacuum supply tubes 68 extend outward radially, one tube being connected to each supporting unit which may be constructed to control the vacuum to the vacuum chucks, as described above in connection with Figs. 5, 6 and 7.

Power is supplied from a suitable source to the main drive shaft 69 carrying a toothed sprocket 70 over which passes a driving sprocket chain 71 connected to another sprocket 72 carried by a rotary toothed gear 73 meshing with a bevel pinion 74 keyed to the turret drive shaft 58. The drive shaft 69 rotates at a substantially constant angular velocity, but a variable angular velocity is imparted to the turret by means of the control device cooperating with the sprocket chain, as shown in Fig. 8. A rockable control lever 75 pivoted to a suitable supporting bracket carries an idler sprocket 76 engaging with the sprocket chain 71. A tension spring 77 is connected to the control lever 75 so as to urge the idler sprocket 76 against the upper reach of the sprocket chain 71 normally causing a sag or depression in the latter. The rear end of the control lever 75 is provided with a tail piece or cam 78 adapted to engage successively with trip members 79, one of which is carried by and depends from the lower side of each of the lower supporting bars 61 of the supporting arms 59.

For supporting the eggs or other articles A, a conveyor is conventionally shown at 80. The eggs may be deposited upon this conveyor, either manually or otherwise, and they are preferably arranged in transverse rows as shown so as to be aligned for cooperation with the groups of vacuum lifters described. Rows of apertures or seats are provided in the supporting plates of the conveyor for this purpose. This conveyor may be driven from the main drive shaft 69 which is connected to a driving sprocket 81 through bevel gears 82.

Another conveyor 83 is shown as positioned diametrically opposite from the conveyor 80 with reference to the rotary turret 57. The receiving conveyor may also be driven from the main drive shaft 69 as through driving connections indicated diagrammatically at 83'. It will be observed that the conveyors 80 and 83 move in opposite directions, the respective arrows indicating the direction of movement of each, while the upper arrow in Fig. 9 indicates the direction of rotation of the turret 57. The receiving conveyor 83 preferably carries receiving supports 84 having seats or compartments arranged in transverse rows similar to those of the conveyor 80 for receiving the eggs or other articles which are deposited thereon by the supporting unit 60.

For successively lowering the article supporting unit 60 into article engaging position and thereafter raising it, a raising and lowering device cooperating with the supporting arms 59 is provided. As shown, this device includes a raising and lowering cam 85 having its upper surface inclined or otherwise formed to cooperate with cam rollers 86 carried by brackets 97 depending from the lower supporting bar 61. This raising and lowering cam 85 is shown in the form of a substantially circular ring carried by supporting arms 87 on the frame 56. This cam ring forms a positioning support for each of the supporting arms 59 and is formed to lower each supporting arm 59, together with the article supporting unit 60 carried thereby into article engaging position, as each supporting unit is brought into vertical alignment with the articles carried on the conveyor 80. The cam is also formed to lower the article supporting unit into article depositing position when each supporting unit arrives at vertical alignment with the receiving seats of the receiving supports 84. After each lowering movement the supporting unit is caused by the cam to be raised again after an interval.

In order to establish and discontinue the lifting vacuum at each of the vacuum chucks 10, an automatic trip or vacuum controlling element 88 is mounted in position for cooperation with the control lugs 52. This trip member 88 may be mounted in any appropriate manner on the apparatus and is provided with terminal cams 89 adapted to engage with the lugs or rollers 52. When the turret rotates, it will, therefore, be seen that the control rollers 52 cooperate with the trip 88 to discontinue the vacuum supply to the vacuum chucks. When each roller 52 passes successively beyond the trip 88, the corresponding spring 48 becomes effective to establish the vacuum at each of the vacuum chucks as described.

Each article supporting unit is also advantageously provided with means for rotating the vacuum chucks 10. The apparatus above described, including the longitudinally reciprocating rack bars 55, may be utilized for this purpose. Two rack bars 55, one for each longitudinal series of chucks may be provided, and an operating extension 90 is operatively connected to both rack bars, having a depending lug 91 adapted to cooperate with a cam flange 92 carried in any appropriate manner by the frame 56. This cam flange is provided at opposite extremities with outwardly curved cam surfaces 93.

Electric current for supplying the testing lamps 29 of the vacuum chucks may be supplied through the cam ring 85 which, for this purpose, is insulated from its supports as indicated at 95. The roller 86 thus functions as a current collector. Since the lamps need to be illuminated only during the testing operation, the current may be cut off at other times. This function is effected in the embodiment shown by providing insulation 96 on the upper face of the cam ring 85. The roller supporting bracket 97 may be insulated from the supporting bar 61, as indicated, and a conductor 96 connected to the insulated bracket, leading to one side of the lamp circuit. The other side of the circuit may be grounded in any well known manner. This circuit, with controlling means therefor, is provided for each article supporting unit. When the roller 86 engages insulation 96, illumination of the lamps will be discontinued, but will be again established when the roller passes beyond the limit of the insulation.

The operation of the automatic apparatus disclosed in connection with Figs. 8 and 9 will now be understood and may be briefly summarized as follows:

As the turret 57 rotates, the article supporting units 60 are brought successively into vertical alignment with rows of articles carried by the conveyor 80, both conveyor 80 and 83 continuously moving at a constant rate of speed. As an article supporting unit approaches alignment with the articles, the corresponding trip member 79 is brought into engagement with the tail member or cam 78 of the control lever 75 rocking the latter and causing the idler sprocket 76 to be retracted away from the sprocket chain, as shown in Fig. 8. This action causes slack in the driving side of the sprocket chain, by virtue of which the rotary movement of the turret momentarily halts. The driving connections are so proportioned that the speed of the article supporting unit is lowered to substantially that of the conveyor 80 for a short period during which the articles are engaged by the vacuum chucks.

At this moment the vacuum is established and immediately the supporting unit is caused to rise by engagement of the cam rollers 86 with the cam 85, thus lifting the eggs or other articles from the moving conveyor 80. Should some of the eggs be out of alignment or of different shape or size or position, the vacuum chucks 10, by virtue of their flexible mounting, will automatically adjust themselves into correct engaging contact with the eggs as fully described above. When the trip 79 passes beyond the tail member 78, lever 75 is restored to normal position by spring 77, the turret thus again resuming normal speed.

Just prior to the movement of the article supporting unit 60 into article engaging position, as described, the operating roller 52 of the valve 47 passes from engagement with the control element 88 with which it had previously been in contact during substantially 180° of movement. This releases the valve 47 to action of the spring 48, thus closing the ports 50 and opening the vacuum supply port 46, to establish the vacuum at each of the lifting chucks. Therefore, when the article supporting unit is again elevated away from the conveyor 80, by action of the cam 85, the articles will be lifted and transferred with the supporting unit.

In a manner similar to that above described, each article supporting unit is, by action of the raising and lowering cam 85, successively lowered into cooperative position relatively to the receiving conveyor 83, and raised from such cooperative position after depositing the eggs on said receiving conveyor. Just as the article supporting unit moves into depositing position, or approximately at this period, the valve controlling roller 52 engages with the inclined surface 89 at the left in Fig. 9, thus opening the vacuum exhaust ports 50 and closing the vacuum supply ports 46. Therefore, when the unit is again raised, the eggs are left behind and deposited in their appropriate seats or compartments on the receiving supports 84. The rollers 52 will be of sufficient length to remain in contact with the trip element 88 throughout the limit of the raising and lowering movement of the supporting unit.

During the period of transfer movement of the supporting units, or for any desired portion of this period, the testing lamps 29 will be illuminated, the circuits therethrough being completed as described. Therefore, an observer positioned in front of the machine, that is, somewhere in the radial line passing through the station indicated at B, can observe the eggs as they are being transferred. It will thus be seen that various different sides of the eggs are presented to the view of the observer as the eggs pass from right to left past the observer's station. This gives an especially good opportunity for the detection of any defects or imperfections that may be present.

To further facilitate the thorough testing of the eggs, the rotating means therefor, as above described, may also be utilized. It will be understood, however, that for some purposes this rotating mechanism may be omitted. When the supporting unit with the group of eggs carried thereby is approaching from the right as viewed in Fig. 1 toward the observer's station, the depending lug 91 will engage with the forward cam surface 93 moving rack bars 55 in one direction, thus imparting a turning impulse to all of the eggs. The character of this impulse may be varied at will by varying the shape or position of the cam surface 93, that is, the rotary impulse may be abrupt or rapidly accelerated, or the acceleration may be less rapid. As soon as the operating lug 91 passes beyond the inclined cam surface 93, to the centrally disposed circular part of the cam flange 92, the rotation of the chucks will be discontinued because the curvature of this portion of the cam flange is concentric with the axis of rotation of the turret. It will therefore be seen that the eggs with the contents thereof are given a rotary movement, due to the action of the cam surface 93.

When the rotary movement of the chucks is arrested, as described, the shells of the eggs are similarly arrested, but the contents of the eggs, due to the fluid character thereof, may continue due to inertia to rotate. The egg contents may thus continue to rotate as the eggs pass by the observer, thus providing an additional means for subjecting the eggs to a thorough inspection from different angles. As the rollers 52 pass beyond the end of the cam flange, during continued rotation of the turret, the chucks will be restored to their original position through action of the tension spring 94.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention what I claim as new, and desire to secure by Letters Patent, is:—

1. In combination, a vacuum chuck including a cup of pliable material, a tubular supporting stem for said cup having a part of increased pliability adjacent its attachment with the cup, a vacuum conduit leading to said cup, and a source of light within said conduit positioned to emit light rays through stem of said chuck to an article carried thereby.

2. In a device of the character described, in combination, a vacuum pick-up chuck, a tubular support, a universally angularly adjustable mounting for said vacuum chuck between the latter and said tubular support, means for mounting said tubular support for yielding retraction, a stop for positioning the tubular support in extended position, and a vacuum conduit directly sealed to said chuck and passing through said tubular support.

3. In a device of the character described, in combination, a support, a group of vacuum pick-up chucks carried by said support and individually spaced apart thereon, a plurality of yieldingly retractible supporting members carried by said support, each of which individually supports one of said chucks, and an individual universally flexible support having a section of increased flexibility and being interposed between each chuck and the respective retractible supporting member, said section being of round cross sectional form.

4. In a device of the character described, in combination, a support, a group of vacuum pick-up chucks carried by said support and individually spaced apart thereon, a plurality of yieldingly retractible supporting members carried by said support, each of which individually supports one of said chucks, and an individual pliable supporting piece interposed between each chuck and the respective retractible supporting member, said supporting piece being contracted and of round cross sectional form adjacent its connection with the chuck to increase its pliability.

5. In a device of the character described, in combination, a support, a group of vacuum pick-up devices carried by said support and individually spaced thereon, automatic means for establishing and discontinuing the vacuum in said vacuum devices to lift and release articles, and an individual pliable supporting piece having a section of increased pliability for each vacuum device whereby the latter are independently and individually adjustable into various article engaging positions, said section being of round cross sectional form.

6. In a device of the character described, in combination, a support, a group of vacuum pick-up chucks carried by said support, means for bringing the chucks to cooperate individually with a plurality of articles, individual article-cooperative means for each chuck whereby said chucks are automatically individually adjusted into engaging position, vacuum connections for said chucks, means for transferring the chucks with the articles carried thereby, means for releasing the vacuum so as to release the articles, light sources for each of said chucks, and means for confining light from said sources to pass to the articles carried by the chucks.

7. In an egg-testing apparatus, in combination, a plurality of vacuum chucks arranged in a unitary group, individual flexible mounting means for each chuck, means for directing a beam of light upon an egg carried by each vacuum chuck, and means for transferring the eggs carried by the chucks so as to present different sides to an observation station while subjected to said beam.

8. In an egg-testing apparatus, in combination, a plurality of vacuum chucks arranged in a plurality of unitary groups, a movable support for each of said groups, a plurality of movable egg carriers, means for moving said movable supports so as to bring the groups of vacuum chucks successively into registry with eggs carried by one of said egg carriers, means for driving said groups of chucks at a differential speed to accommodate them to the speed of the eggs on the carrier when coming into registry therewith, and means for releasing the eggs from said chucks when the respective groups of chucks come into alignments with a second egg carrier.

9. In an egg handling apparatus, in combination, a plurality of vacuum chucks arranged in a unitary group, individual flexible mounting means for each chuck, a vacuum manifold communicating with each vacuum chuck of said group, a supporting base for said manifold, a yieldingly resisted retractible support for each vacuum chuck mounted upon said supporting base, and a rotary supporting turret for said base having a vacuum supply conduit leading therethrough and connected to said manifold.

10. In an egg handling apparatus, in combination, a plurality of vacuum chucks arranged in a unitary group, individual flexible mounting means for each chuck, a vacuum manifold communicating with each vacuum chuck of said group, a supporting base for said manifold, a yieldingly resisted retractible support for each vacuum chuck mounted upon said supporting base, and a rotary supporting turret for said base having a vacuum supply conduit leading therethrough and connected to said manifold, and means for effecting unidirectional rotation of said turret for effecting transfer of eggs carried by said chucks.

11. In an egg handling apparatus, in combination, a plurality of vacuum chucks arranged in a unitary group, individual flexible mounting means for each chuck, a vacuum manifold communicating with each vacuum chuck of said group, a supporting base for said manifold, a yieldingly resisted retractible support for each vacuum chuck mounted upon said supporting base, a rotary supporting turret for said base having a vacuum supply conduit leading therethrough and connected to said manifold, means for effecting unidirectional rotation of said turret for effecting transfer of eggs carried by said chucks, and means automatically controlled by said rotation for establishing and discontinuing the lifting vacuum at said chucks at predetermined intervals.

12. In an egg handling apparatus, in combination, a plurality of vacuum chucks arranged in a unitary group, individual flexible mounting means for each chuck, a vacuum manifold communicating with each vacuum chuck of said group, a supporting base for said manifold, a yieldingly resisted retractible support for each vacuum chuck mounted upon said supporting base, a rotary support for said base, means for positioning said group of chucks for cooperation with the eggs, means for establishing the lifting vacuum at said chucks, means for rotating said rotary support, for transferring the eggs, means for discontinuing said lifting vacuum, and means for transmitting a beam of light through each chuck-supported egg while being transferred by said rotary support.

13. In an egg handling apparatus, in combination, a plurality of vacuum chucks arranged in a unitary group, individual flexible mounting means for each chuck, a vacuum manifold communicating with each vacuum chuck of said group, a supporting base for said manifold, a yieldingly resisted retractible support for each vacuum chuck mounted upon said supporting base, a rotary support for said base, means for positioning said group of chucks for cooperation with the eggs, means for establishing the lifting vacuum at said chucks, means for rotating said rotary support, for transferring the eggs, means for discontinuing said lifting vacuum, and means intermittently varying the rotative velocity of said rotary support.

CHARLES K. POWELL.